United States Patent [19]
Schneider

[11] 3,797,499
[45] Mar. 19, 1974

[54] POLYLACTIDE FABRIC GRAPHS FOR SURGICAL IMPLANTATION

[75] Inventor: Allan K. Schneider, Wilmington, Del.

[73] Assignee: Ethicon, Inc., Somerville, N.J.

[22] Filed: Oct. 6, 1971

[21] Appl. No.: 187,039

Related U.S. Application Data

[62] Division of Ser. No. 36,797, May 13, 1970, Pat. No. 3,636,956.

[52] U.S. Cl. .......................... 128/334 R, 128/92 B
[51] Int. Cl. ...................... A61l 15/04, A61l 17/00
[58] Field of Search ........... 128/334 R, 335.5, 92 B; 260/78.3 N

[56] References Cited
UNITED STATES PATENTS

| | | | |
|---|---|---|---|
| 2,668,162 | 2/1954 | Lowe | 128/335.5 |
| 3,225,766 | 12/1965 | Baptist et al. | 128/335.5 |
| 3,297,033 | 1/1967 | Schmitt et al. | 128/335.5 |
| 3,636,956 | 1/1972 | Schneider | 128/335.5 |

FOREIGN PATENTS OR APPLICATIONS

| | | | |
|---|---|---|---|
| 779,291 | 7/1957 | Great Britain | 260/78.3 |

*Primary Examiner*—Dalton L. Truluck
*Attorney, Agent, or Firm*—Robert W. Kell

[57] ABSTRACT

Absorbable surgical sutures that are dimensionally stable within the body may be prepared by the extrusion of polylactide polymer, including copolymers of L(−) lactide with up to 35 mole percent of glycolide. Said polymers are characterized by an inherent viscosity of at least 1.0, and the extruded filaments are oriented by drawing at a temperature of about 50° to about 140° at a draw ratio of up to 11×, and annealed. Sutures so prepared have a tensile strength of from 25,000 p.s.i. to 100,000 p.s.i.

6 Claims, 5 Drawing Figures

PATENTED MAR 19 1974

3,797,499

POLYLACTIDE FABRIC GRAPHS FOR SURGICAL IMPLANTATION

This application is a division of my copending U.S. application Ser. No. 36,797, now U.S. Pat. No. 3,636,956 filed May 13, 1970.

This invention relates to new articles of manufacture and to their use. More particularly, the invention is concerned with surgical aids prepared from synthetic polymers including co-polymers of lactic acids and their use in surgical applications, e.g., sutures and ligatures and other prosthetic devices used in joining or supporting living tissues.

Catgut (actually from sheep or beef intestine) is the most commonly used absorbable suture now on the market. In many instances, however, it may cause adverse tissue reaction in the sutured flesh. This, together with the fact that it requires storage under moist conditions, makes it less than an ideal suture material. Nylon, stainless steel, cotton, linen, ramie, "Teflon" fluorocarbon resin, "Dacron" polyester fibers, silk, and other materials have been suggested and/or used as surgical sutures. Some of them have advantages over catgut in strength, uniformity, and storage characteristics, but they are not absorbed by living tissue.

Among the requirements of the ideal absorbable suture product are that it should handle properly, should approximate and hold tissue for proper healing with the least possible damage, should not tear tissue, should have adequate tensile strength, should be controllably uniform in properties, including dimensional stability within the body, should be sterilizable, should be absorbable by living tissue, preferably at a constant rate regardless of the place in the body and the condition of the patient, without causing such unfavorable tissue reactions as walling off, granuloma formation, excessive edema, etc., and finally should be capable of tying and holding surgical knots properly.

This invention fulfills the above requirements to a remarkable degree by providing highly oriented, high tenacity filaments of polymers and copolymers of lactic acid, the filaments having excellent dimensional stability in body tissue and preferably retracting less than 10 percent in an emperical test in which the filaments are immersed in water at 37°C. for a period of 24 hours.

These filaments are prepared from lactic acid homopolymers and copolymers having an inherent viscosity of at least 1, preferably above 1.2, as determined at 0.1 percent concentration in benzene by weight at 25°C. prior to being oriented. Any polylactide composition containing up to about 15 percent by weight of repeating units of the formula:

(1)

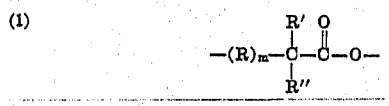

wherein R is lower alkylene, preferably methylene ($-CH_2-$) or ethylene ($-CH_2CH_2-$), $m$ is 0 or 1, R' is hydrogen or lower alkyl, R" is hydrogen or alkyl of up to about 22 carbons when $m$ is 0 and hydrogen or lower alkyl when $m$ is 1, and can be the same as R' or different, can be employed to make the sutures of this invention. Preferred, because of availability of starting materials, are repeating units derived from alpha-hydroxycarboxylic acids, i.e., units of the above formula in which $m$ is zero. Most preferred, because of the properties of the sutures made therefrom, are repeating or comonomer units derived from glycolide or DL-lactide, i.e., repeating units of formula (1) in which $m$ is 0, R' is hydrogen or methyl, and R" is hydrogen. In other words, the number of carbon atoms in the repating unit is 2 to about 24, preferably 2 to about 8, and most preferably 2 to 3. It will be understood that when $m$ is zero, R' is methyl, and R" is hydrogen, the repeating unit in formula (1) could be derived from DL-lactide. This would result in a copolymer containing both antipodal species derived from alpha-hydroxypropionic acid. When the repeating unit in formula (1) is identical with the principal unit, the polylactide composition is a homopolymer. In the specific instance when $m$ is 0 and both R' and R" are hydrogen, (when glycolide is the comonomer), the polylactide composition may contain about 35 mole percent of repeating units of the formula:

(2)

Such copolymers of L(−) lactide and glycolide may also be employed to make the sutures of this invention.

Illustrative of the comonomers which can be employed with the lactide to form copolymers useful in preparing the filaments of this invention, there can be named glycolide, beta-propiolactone, tetramethylglycolide, beta-butyrolactone, gamma-butyrolactone, pivalolactone, and intermolecular cyclic esters of alpha-hydroxybutyric acid, alpha-hydroxyisobutyric acid, alpha-hydroxyvaleric acid, alpha-hydroxyisovaleric acid, alpha-hydroxycaproic acid, alpha-hydroxy-alpha-ethylbutyric acid, alpha-hydroxyisocaproic acid, alpha-hydroxy-beta-methylvaleric acid, alpha-hydroxyheptanoic acid, alpha-hydroxyoctanoic acid, alpha-hydroxydecanoic acid, alpha-hydroxymyristic acid, alpha-hydroxystearic acid, and alpha-hydroxylignoceric acid.

The filaments prepared from the above-described lactide polymers and copolymers are conveniently formed by melt-extruding the polylactic acid through a spinneret and then drawing the filaments in one or more stages to about four times their original length to effect orientation and to improve their tensile strength. The resultant oriented filaments are strong and retain much of their strength on being tied into surgeon's knots.

To further improve their dimensional stability and particularly tensile strength retention, one may subject them to an annealing treatment. This optional annealing treatment is effected by heating the filament, while holding it essentially taut, at 60° to 150°C., and then allowing it to cool to room temperature (25°C.) while held taut. The annealing is preferably conducted for such a time that the filament shows less than 10 percent shrinkage on subsequent immersion, for 24 hours without tension, in water at 37°C. The heating step of annealing usually requires from 0.5–5 minutes, to as long as 1 week.

A filament which meets the foregoing shrinkage test (37°C.) undergoes substantially no shrinkage when used as a suture in contact with body tissues (see Example II). The conditions of this test are designed to give a quick in vitro measure of the dimensional stability of the filaments that can be projected to their usefulness as suture materials, In this connection, it should be mentioned that the conditions of draw have an influence over the shrinkage. Further, it has been found that those filaments showing little shrinkage in 24 hours at 37°C. have relatively little shrinkage when implanted in an animal body.

Since the function of a suture is to join and hold severed tissue until healng is well along, and to prevent separation as a result of movement or exercise, the suture should have adequate strength. It is particularly important that strength be maintained when knots are tied and during the actual procedure of drawing tight a suitable knot. Filaments from lactic acid polymers in high molecular weight oriented form are exceptionally strong and most significantly retain a high proportion of their strenght at the knot point, as shown in the following table.

TABLE I

|  | Tensile Strength (Straight Pull) psi | % Elongation at Break | Tensile Strength (Surgeon's Knot)[5] psi | % Loss in Strength, Knot vs. Straight |
|---|---|---|---|---|
| Poly-L(-) lactide | 120,000[1] | 17 | 85,000 | 29 |
| Poly-L(-) lactide | 100,000[2] | 16 | 75,000 | 25 |
| Catgut | 50,000[3] | 20 | 29,000 | 42 |
|  | 44,000[4] | 20 | 27,00 | 39 |
| L(-) lactide/ gamma-butyrolactone (95/5) copolymer | 59,000[6] | 17 | 42,000 | 29 |

[1]Inherent viscosity = 2.5, 10× draw, 0.006 inch diameter
[2]Inherent viscosity = 2.5, 10× draw, 0.005 inch diameter
[3]Chromic gut—(0.008–0.010 inch diameter)
[4]Chromic gut—(0.010–0.013 inch diameter)
[5]After U.S. Pharmacopoeia
[6]Inherent viscosity (bulk polymer) = 3.0 (spun filament) = 1.6, 10× draw, 0.009 inch diameter As will be apparent from Table I, the inherent viscosity of the spun fialment, i.e., the oriented filament, may be somewhat less than that of the bulk polymer or copolymer, for during the extrusion operation some degradation of the polymer may occur depending on the extrusion conditions employed. If the sutures are sterilized by high energy radiation, there may be a further lowering of the molecular weight of the polymer, and a resulting decrease in tensile strength. However, by starting with lactide polymers and copolymers having inherent viscosities of at least 1, the sutures prepared therefrom are entirely satisfactory if one minimizes degradation during sterilization, even though there may be some loss in inherent viscosity due to extrusion and orientation.

The filaments of this invention are further characterized by their hydrolysis behavior and absorbability. On treatment with boiling water for 100 hours, they lose at least 20, and preferably at least about 50 percent, of their weight. On treatment with boiling water for a period of 50 hours, the copolymers lose at least about 8 percent of their weight, and preferably they lose at least about 35 percent of their weight.

By varying the type and amount of comonomer employed, the rate of hydrolysis (absorption) of the suture can be controlled. In contrast to the highly variable absorption rates of catgut, the absorption of polylactide polymers is relatively more independent of the place in the body where used and of the condition of the patient. Since the hydrolysis rate of a particular lactic acid polymer is constant at a fixed temperature, say, at 37°C., absorption can be speeded up, for instance, by using different copolymers. For example, poly-L-lactide was 15.3 percent absorbed in the back muscle of a rat after 270 days. Under comparable conditions, L(−)-Lactide/DL-lactide (97/3) copolymer was 18.5 percent absorbed, L(−)-lactide/DL-lactide (95/5) copolymer was 29.0 percent absorbed, L(−)-lactide/glycolide (95/5) copolymer was 27.3 per cent absorbed, and chromed catgut was 67 percent absorbed. The rate of absorption of a copolymer of L(−)-lactide and glycolide increase with increasing amounts of glycolide in the polymer chain.

As already indicated, high tensile strength is an exceedingly desirable characteristic for suture materials. The filaments of the present invention are characterized by having a tensile strength of at least 25,000 p.s.i., preferably above 40,000 p.s.i. Some have tensile strengths ranging up to 100,000 psi and higher. Their knot strengths, expressed in lbs. of pull, exceed the minimum limits set for absorbable sutures by the U.S. Pharmacopoeia, i.e., from 0.125 lb. for a 0.001–0.002 inch filament to 25 lbs. for a 0.036–0.040 inch filament.

In preparing the polymers and copolymers from which the filaments of this invention are made, the appropriate intermolecular cyclic ester or intramolecular cyclic ester (lactone) of the hydroxy acid is employed. These can be derived from pure D(−)- or L(+)-lactic acids, the optically inactive DL-lactic acid mixture, any desired mixtures of pure D(-)-lactic and L(+)-lactic acids, and other alpha, beta, or gamma-hydroxy acids, about which more will be said later. In general, it is preferred, for the preparation of lactic acid homopolymers and for the introduction of lactide repeating units into copolymers to use as a starting material a lactide derived from either the pure L(+)-acid or pure D(−)-acid because the polymers obtained therefrom have a higher melting point than those derived from the DL-acid mixtures, are much less water-sensitive, are stronger, and have a greater degree of crystallinity. For example, the polylactides from the DL-acid melt at 130° to 140°C., whereas those from the L(+)-acid melt at 145° to 175°C. The polylactides from the L(+)-acid or D(−)-acid are less sensitive to alcohol, a commonly used disinfecting medium in surgery, than those from the DL-acid. The L(+)-form is more readily available than the D(−)-acid and hence is particularly preferred. It is to be understood that the various lactides can be made from the corresponding lactic acids by a variety of published methods including that described in Schneider U.S. Pat. No. 2,703,316.

Table II, below, summarizes data comparing the properties of polymers prepared from L(−) lactide with those prepared from DL-lactide.

TABLE II

| | Polymer From | |
|---|---|---|
| | DL-lactide | L(-) lactide |
| inherent viscosity | 0.7–2.0 | 0.7–3.5 |
| melting point | 130°–140°C. | 145°–175°C. |
| optical activity | no | yes (−186°) |
| solubility | CHCl$_3$, benzene, acetone | CHCl$_3$, benzene, acetone |
| density | 1.26 | 1.26 |
| tensile strength at break (monofilament) | 20,000– 40,000 psi | 70,000– 100,000 psi |

| | | |
|---|---|---|
| elongation at break (monofilament) | 15–30 percent | 15–30 percent |
| tensile strength at break (dry film) | 26,000 psi* | 29,000 psi* |
| inherent viscosity (film) | 1.29* | 1.27* |
| elongation at break (film) | 48 percent* | 23 percent* |

*Taken from U.S. Pat. No. 2,758,987.

In general, the tensile modulus, melting point, and specific rotation of a lactic acid polymer is maximum for the homopolymer of a single antipodal species and decreases with increasing amounts of the other antipodal species in the polymer chain. This characteristic of lactic acid copolymers is an advantage since it permits one to choose a copolymer composition that can be extruded to form filaments which have improved flexibility, without appreciable sacrifice in strength.

In preparing copolymers, the repeating units derived from comonomers discussed above are introduced by use of the appropriate cyclic esters. For repeating units derived from alpha-hydroxy acids, these are usually the intermolecular cyclic esters containing six-membered rings, e.g., glycolide. For repeating units derived from beta- or gamma-hydroxy acids, the monomeric lactones, e.g., beta-propiolactone and gamma-butyrolactone, are usually used.

The polymer filaments of the present invention may be woven, braided, or knitted either alone or in combination with nonabsorbable fibers such as nylon, polypropylene, ORLON, DACRON, or TEFLON to form tubular structures having use in the surgical repair of arteries, veins, ducts, esophagi and the like. The manufacture of such tubular structures wherein the wall of the tube is fabricated of absorbable and nonabsorbable threads is described in U.S. Pat. Nos. 3,304,557; 3,108,357; and 3,463,158; the teachings of which are incorporated herein by reference. Inasmuch as the polylactide filaments are thermo-plastic such tubular grafts may be crimped on a mandrel at elevated temperature and upon cooling to room temperature, will retain the crimp.

Tubular structures of polylactide filaments may be prepared that are resistant to radial compression and expansion by applying a helical wrapping of polypropylene monofilament around the external surface of the tube and fusing the polypropylene to unite the helical wrapping with the polylactide filaments in the external surface of the tube as illustrated in U.S. Pat. No. 3,479,670.

The polymers of the present invention are also useful in the manufacture of cast films and other solid surgical aids such as scleral buckling prostheses. Thus, cylindrical pins, screws, reinforcing plates, etc. may be machined from the cast polymer having in vivo absorption characteristics depending upon the polymer composition and molecular weight.

The invention will appear more clearly from the following detailed description when taken in connection with the accompanying drawings which show by way of example preferred embodiments of the inventive idea. Referring now to the drawings.

Figure 1:
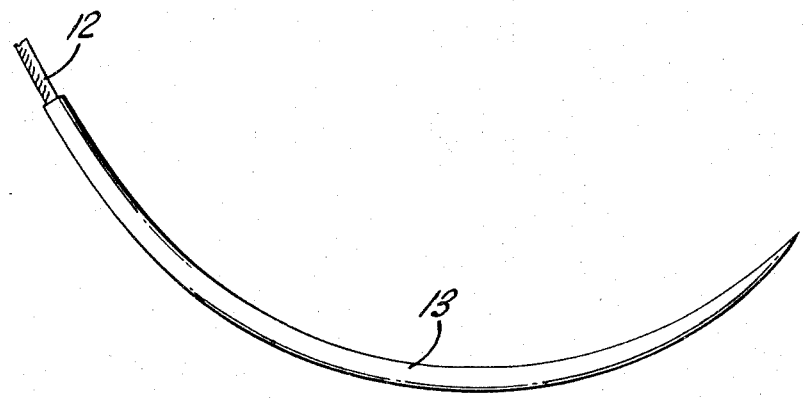
FIG. 1 is a perspective view of a needle-suture combination.

In preparing the filaments of this invention, it is essential to use polymers made from highly-purified lactides. For example, for excellent results L(−) lactide should have a melting point of at least 96°C. and a specific rotation greater than −295°. The polymerization is effected by heating the lactide above its melting point, but below about 215°C. in the presence of a polyvalent metal oxide or compound thereof, under anhydrous conditions in an inert atmosphere.

Specially useful catalysts are zinc oxide, zinc carbonate, basic zonc carbonate, diethylzinc, titanium, magnesium or barium compounds, litharge, stannous octoate and the like.

The amount and type of catalyst used determine the paticular temperature and time required to produce polymer useful for conversion to the filaments of this invention. Thus, the amount can be as low as 0.001 weight percent or as high as 2 weight percent. As a rule, the lower the amount of catalyst, the longer the time required to produce polymer of a given inherent viscosity and, conversely, the higher the catalyst concocetration, the shorter the time. The best balance is usually obtained employing from 0.02 weight percent to 1 weight percent of catalyst.

In general, it is desirable to agitate the reaction mixture continuously during the polymerization in order to produce a homogeneous polymer at good conversions and to conduct the reaction in two steps, the first being carried out at a lower temperature than the second, or finishing step. Other methods, such as those disclosed in U.S. Pat. Nos. 2,703,316 and 2,758,987 can be used in making the polymers.

The following is a brief description of a method for preparing the polymer useful for conversion to the filaments of this invention: lactide, purified by several crystallizations from carbon tetrachloride, is placed with one or more solid comonomers in a thoroughly dried reactor equipped with a stirring bar, nitrogen inlet tube, and a drying tube filled conveniently with anhydrous magnesium sulfate or calcium chloride. Nitrogen, which has been dried by passage through anhydrous magnesium sulfate or calcium chloride, is introduced immediately above the reaction mixture and heating and stirring are started. When the temperature of the reaction mixture has reached about 100°C., the nitrogen inlet is replaced by a thermometer, and from about 0.001 to 2 weight percent of an oxide or salt, of Group II metal of atomic number 12 through 56, or litharge is added. In the case of copolymerization with a liquid comonomer the liquid comonomer is preferably added after the lactide has melted. Heating is continued until polymer having an inherent viscosity of at least 1 to 0.1 percent concentration in benzene at 25°C. is obtained. This may require from a few minutes up to 25 or more hours, depending upon the catalyst used.

Polymer, produced as above, may be suitably further treated by cutting it into small pieces, dissolving in a suitable solvent, for example, benzene, toluene, or xylene, and the polymer precipitated by pouring the solution into a large volume of a nonsolvent for the polymer, desirably hexane. The precipitated polymer is removed by filtration, transferred to a blender and a nonsolvent for the polymer is added. The blender is started and after a homogeneous mixture has been obtained, the mixture is filtered. The polymer is allowed to dry on the filter and is then transferred to a vacuum oven.

After drying overnight at 100°C., the polymer is removed from the oven and allowed to cool to ambient temperature.

As already indicated, the polymer material can be converted to filaments by melt-extrusion and also by spinning from solution. The diameter of the resulting filaments may be as small as 0.001 inch or less for the individual strands making up the multifilament structures and as large as 0.045 inch for very heavy monofilament sutures. Generally, however, the filaments of this invention will not have a diameter greater than 0.020–0.025 inch. Preferred are monofilaments having diameters of about 0.001–0.020 inch and multifilament structures having individual filaments of from less than 0.00025 to 0.003 inch diameter.

It will be understood that spinning and drawing may be done singly or in multiples. To prepare multifilament braided sutures, one may take either monofilaments or groups of filaments to braid.

Spinnerets having orifice sizes of 0.005 inch or larger, say, up to 0.150 inch, are suitable for spinning monofils. In spinning from solution, the solution may be extruded either into an atmosphere heated up to or above the boiling point of the solvent or into a nonsolvent for the polymer, e.g., hexane.

After spinning, the polylactide polymer and copolymer filaments are drawn to effect orientation and to improve tensile strength. This is accomplished by drawing (permanently elongating) the filaments at a temperature between 50°C. and 140°C., preferably between 90°C. and 135°C. the preferred draw ratio being from 3:1 to 11:1. The drawing step may be conducted in one or more steps, in air or in a bath containing a liquid non-solvent for the polymer, e.g., glycerol or water. This drawing brings about a marked increase in tensile strength and molecular orientation, as measured by the X-ray orientation angle.

Following the drawing, the filaments may be subjected to annealing. This may be carried out by running the oriented filaments from a feed roll to a take-up roll and heating the filaments between the rolls, with the take-up roll rotating at a speed ranging from the same speed of the feed roll to a speed 4 percent slower than that of the feed roll. At the first mentioned speed ratio, essentially no shrinkage will take place, and at the second mentioned speed ratio shrinkage will take place up to 4 percent of its length. As a consequence of this annealing, the filaments undergo essentially no shrinkage under the action of body fluids, when used as sutures.

Instead of spinning the polylactide polymers into filaments, it is possible to extrude or cast it into films, which are then drawn and annealed. The films thus treated can be cut into narrow strips for use as sutures. In the preferred embodiment the sutures are made from filaments.

As best illustrated in FIG. 1, if the polylactide filaments 12 are to be used for suturing, one end thereof may be inserted in a drilled needle 13 and securely fastened in place by swaging to form a needle and suture combination.

Figure 2:
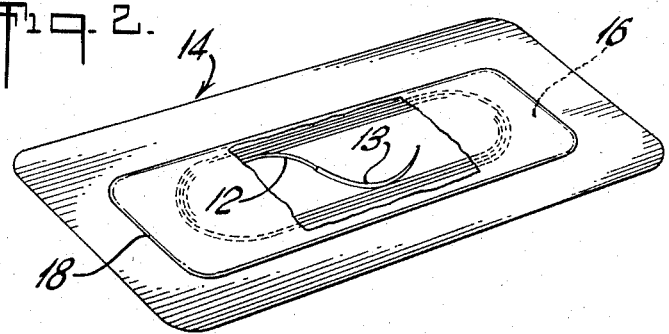
FIG. 2 is a perspective view of a suture-needle combination within a hermetically-sealed container.
Figure 3:
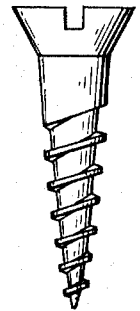
FIG. 3 illustrates a screw machined from the polymer of the present invention.

Polyactide filaments, unlike catgut, are adversely affected by moisture and tubing fluid. For this reason, polylactide prostheses are packaged dry in a hermetically-sealed package a preferred form of which is shown in FIG. 2. Referring now to FIG. 2, there is shown a surgical package indicated generally as 14 having disposed therein a coil of polylactide suture 12 one end of which is attached to a needle 13. The needle and suture are positioned within a cavity 16 that is evacuated or filled with a dry atmosphere such as nitrogen. The package is fabricated of two sheets of aluminum foil or aluminum foil plastic laminate material and heat sealed or bonded with adhesive at the skirt 18 to hermetically seal the cavity and isolate the contents of the package from the external atmosphere.

It is to be understood that minor amounts of inert additives such as coloring materials and plasticizers can be incorporated in the sutures by being mixed with the copolymers by known techniques. Any of a variety of plasticizers such as, for instance, glyceryl triacetate, ethyl benzoate, and diethyl phthalate can be used to advantage, especially with poly-L lactide. Preferred plasticizers for the glycolide co-polymers are dibutyl phthalate and bis 2-methoxyethyl phthalate. The amount of plasticizer may vary from 1–40 percent based on the weight of the polymer. Not only does the plasticizer render the filaments more pliable and more easy to handle, but it also helps in spinning. By the term "inert" is meant materials that are inert chemically to the polymer, and are inert to living tissue, i.e., do not cause any of the adverse effects discussed earlier in this specification.

The present invention may be further illustrated by the following examples:

EXAMPLE I

Filaments having a diameter of 11.5 to 12.5 mils, a modulus of $1.04 \times 10^6$, tensile strength of 47,000 lb./sq. in., a knot strength of 37,000 lb./sq. in., and an elongation at break of 21 percent, were prepared by spinning polymer from L(−) lactide, said polymer having an inherent viscosity of 2.44 (measured at 0.1 percent concentration in benzene at 25°C.), from melt at 190°C., and drawing to 6:1 ratio in glycerol at 95°C. Some of the filaments were annealed taut at 126°C. and others at 100°C. as shown in more detail in Table III which follows:

TABLE III

| | % Shrinkage |
|---|---|
| Annealed Taut at 126°C. for 5 Minutes | |
| Placed relaxed in oven at 126°C. for 5 minutes | 7.4 |
| Control (i.e., not annealed) | 28.2 |
| Placed relaxed in water at 100°C. for 5 minutes | 13.0 |
| Control | 28.2 |
| Placed relaxed in water at 77°C. for 5 minutes | 1.4 |
| Control | 18.0 |
| Annealed Taut at 100°C. for 5 Minutes | |
| Placed relaxed in oven at 100°C. for 5 minutes | 11.0 |
| Control | 21.4 |
| Placed relaxed in water at 77°C. for 5 minutes | 7.4 |
| Control | 18.0 |

Annealed filaments such as described above are particularly useful as sutures as evidenced from Example II.

EXAMPLE II

A polymer of L(−) lactide, said polymer having an inherent viscosity of 1.4, was melt spun at 160° to 170°C. into a monofilament. The filament was then drawn to four times the undrawn length by passage over a metal plate heated to 90°C. The filament obtained measured 0.007 inch in diameter. To improve dimensional stability, the drawn monofilament was annealed for 3 minutes at 90°–95°C. while under tension.

The drawn, annealed filament was cut to convenient length and sterilized by being placed in polyethylene bags, which were sealed and exposed to two passes under a Van de Graaff beam of 2 million electron volts (1 to 1.5 Mrads. per pass). Some of the bags contained dry monofilament, some contained monofilament in water and some contained monofilaments in ethyl alcohol.

The effect of annealing can be seen by these observations. When the annealed monofilament was heated in a dry oven at 95°C. for 3 minutes in a relaxed state, it shrank less than 4 percent. By contrast, an identical monofilament that had not been annealed shrank 25 percent. The annealed monofilament at 77°C. in water for 5 minutes shrank 14 percent.

In another experiment, the annealed monofilament was implanted in the abdominal cavity of a young adult male rat. After 16 days the implantation was removed. It had undergone less than 2 percent shrinkage.

The monofilaments thus obtained were used to connect severed muscle tissue in rats and in dogs in accordance with the following procedure:

A mid-line incision was made in the rat's abdominal skin, the skin was peeled back, and two small slits were then made in the abdominal muscles, one on either side of the midline. Each rat was sutured with several loops of the sterilized monofils prepared as above in one incision. Each rat had, as a control, either plain or chromic catgut suture in the other incision (size 4-0, 0.006-0.008 inch diameter). The skin was then closed and clamped. The rats were observed at regular intervals.

The sterilized monofils were tested for suturing dogs as follows: a mid-line incision about 3 to 4 inches long was made in the skin over the abdomen of a 6-month old dog. The skin was separated from the abdominal musculature and retracted with conventional retractors. Three incisions about 1 inch long were made through the abdominal musculature. One incision was closed with polylactic acid suture material, the other incisions were sutured with commercial catgut sutures (U.S.P. Type A Plain, Size 4-0, and Type C Medium Chromic, Size 4-0).

Rats were sacrificed at intervals of 2, 4, 7, 14, 28, 59, 91, and 140 days. Dogs were sacrificed at 14, 23, and 50 days. In these examinations it was observed that the polylactic acid monofilaments were more slowly absorbed than plain gut. Further, it was observed that there was less general tissue reaction with the polylactic acid, as shown by gross appearance and by examination of histological sections.

EXAMPLE III

Polymer from L(−) lactide having an inherent viscosity of 3.11 at 0.1 percent concentration in benzene at 25°C., prepared by previously described methods, was converted to sutures by melt spinning, drawing, and annealing as described in Example I.

EXAMPLE IV

Monofils of poly-DL-lactic acid, having an inherent viscosity of 1.42 at 0.1 percent concentration in benzene at 25°C., were tested as sutures after having been sterilized by two passages under a 2 mev electron beam at 1 to 1.25 Mrads. per pass. The sterilized monofils (0.006-0.008 inch diameter) were tested in suturing rats as follows:

A mid-line incision was made in the rat's abdominal skin, the skin was peeled back, and two small slits were than made in the abdominal muscles, one on either side of the midlines. Each rat was sutured with several loops of the sterilized monofils prepared as above in one incision and with a catgut suture as control in the other incision (unchromed, Size 4-0, 0.006-0.008 inch diameter). The skin was then closed and clamped. The rats were observed at regular intervals. After approximately 1 month, the poly-DL-lactic acid sutures were about 50 percent hydrolyzed; tissue reaction was minimal to absent with no evidence of granuloma formation and adhesions. In the rats sutured with catgut, the catgut absorbed to about 60 percent after about 1 month, but there was pronounced tissue reaction with evidence of adhesions and granulation.

After about 60 days, both the polylactic acid and catgut sutures were absorbed, but the rats sutured with the catgut showed more scar tissue than the rats sutured with the polylactic acid.

With rabbits, the suture material was found to be completely absorbed before about 38 days, irrespective of whether it was plain catgut or polylactic acid. However, the rabbits which were stitched with the polylactic acid sutures showed no adverse tissue reactions, with no tissue walling off or covering over of the suture material, in contrast to the behavior of catgut.

A mid-line incision about 3 to 4 inches long was made in the skin over the abdomen of a 6-month old dog. The skin was separated from the abdominal musculature and retracted with conventional retractors. Two incisions about 1 inch long were made through the abdominal musculature. The right side incision was closed with polylactide suture material (Size 4-0). The left incision was sutured with catgut (U.S.P. Type A Plain, Size 4-0). After 4 days the polylactide was intact with no evidence of granulation or adhesion. At the end of 14 days, the dog was again examined and at the time the incision closed with the catgut showed intense inflammatory reaction. In contrast, the incision closed with polylactic acid suture was free of granuloma formation, and the scar was clearly visible, i.e., no inflammation was evident. In both cases, however, the suture material had been absorbed by the tissue.

EXAMPLE V

A mixture of 95 parts by weight of L(−) lactide and 5 parts by weight of DL-lactide was fused under nitrogen, and there was added 0.125 part by weight of diethylzinc as a 25 percent solution in heptane. The mixture was heated at 105°C. for 1 hour at atmospheric pressure in an atmosphere of nitrogen. The solid L(−) lactide/DL-lactide (95/5) copolymer thus obtained had an inherent viscosity of 2.63 (0.1 percent solution in benzene at 34.5°C.). The copolymer was ground to a fine powder, which was in turn pressed to a plug suitable for use in an extrusion-spinning apparatus. Filaments of the copolymer were spun at about 200°C. through a 36 mil. spinneret and were drawn to 6.4 times their original length in glycerol at about 120°C. The drawn filaments had the following properties:

Inherent Viscosity — 1.7
Diameter — 12.5 mils.
Tensile Strength — 58,500 psi
Elongation at break — 20 percent
Modulus — $1.08 \times 10^6$ psi
Knot strength — 37,000 psi Shrinkage after 5 minutes in water at 77°C. — 23 percent Weight loss after 50 hours in boiling water — 39 percent After 30 Days in Distilled Water at 37°C.
  Inherent Viscosity — 0.55
  Tensile strength — 19,000 psi
  Weight loss — 2.6 percent After 90 Days in Distilled Water at 37°C.
  Inherent Viscosity — 0.38
  Tensile strength — 5,000 psi
  Weight loss — 7.0 percent

EXAMPLES VI - XIII

A number of other L(—) lactide copolymers were prepared and spun into filaments by the method of Example V. When the comonomer was a liquid at ordinary temperature (beta-propiolactone, gamma-butyrolactone, or pivalolactone), it was added to the lactide only after the lactide had been fused. The bulk polymer properties, spinning conditions, and filament properties of these copolymers are summarized in the following table.

The copolymer of L-lactide and the intermolecular cyclic ester of alpha-hydroxyheptanoic acid (90/10) was prepared similarly from 45 parts of L-lactide, 5 parts of cyclic ester, and 0.08 part of 25 percent solution of diethylzinc in heptane. After the mixture was heated for 3 hours, the resulting polymer had an inherent viscosity of 2.28.

The spinning conditions and filament properties of these copolymers are summarized in Table V.

The intermolecular cyclic esters of alphahydroxybutyric acid and alpha-hydroxyheptanoic acid were prepared essentially by the method of Bischoff and Walden, Ann. 279, 100 (1895). The sodium salts of the corresponding alpha-bromo acids were made from the acids and sodium methoxide in an ethyl ether/ethyl alcohol mixture. The cyclic esters were made by heating the sodium salts to 300°–315°C. under reduced pressure. The butyric acid derivative was purified by distillation at 78°–85°C./0.07 mm. and by crystallization from ethyl alcohol/petroleum ether, with cooling in solid carbon dioxide. The heptanoic acid derivative was purified by crystallization from pentane, with cooling in solid carbon dioxide, and from ethyl alcohol. Both cyclic esters were characterized by elemental analyses and infrared absorption spectra.

TABLE IV

| | Examples | | | | | | | |
|---|---|---|---|---|---|---|---|---|
| | VI | VII | VIII | IX | X | XI | XII | XIII |
| Weight percent comonomer | 7.5% DL- | 10% DL-lactide | 15% DL-lactide | 5% glycolide | 10% glycolide | 5% beta-propiolactone | 5% gamma-butyrolactone | 5% pivalolactone |
| Inh. visc. (bulk) | 2.87 | 2.50 | 2.39 | 2.53 | 2.52 | 1.31 | 2.99 | 2.63 |
| Spinning temp, (° C.) | 190 | 205 | 200 | 210 | 195 | | 170 | 170 |
| Draw ratio | 8.6 | 8.1 | 7.5 | 8.8 | 8.0 | | 10 | 10 |
| Drawing temp, (° C.) | 128 | 125 | 100 | 125 | 100 | | 115 | 100 |
| Inh. visc. (drawn fil.) | 1.75 | 1.75 | 1.47 | 1.84 | 1.70 | | 1.73 | 1.64 |
| Diameter (mils) | 11.5 | 11.0 | 12.5 | 10.3 | 8.5 | | 9.4 | 8.5 |
| Ten. strength (p.s.i.) | 53,300 | 69,000 | 53,000 | 77,000 | 27,500 | | 59,000 | 78,000 |
| Elong. at break (percent) | 20 | 20.7 | 18.5 | 14 | 32 | | 17 | 22 |
| Modulus (p.s.i.) | $1.4 \times 10^6$ | $1.1 = 10_6$ | $1.1 \times 10^6$ | $1.1 \times 10^6$ | $0.46 \times 10^6$ | | | $1.2 \times 10^6$ |
| Knot strength (p.s.i.) | 37,500 | 37,100 | 30,000 | 43,000 | 27,000 | | 42,000 | 48,000 |
| Shrinkage, percent ($H_2O/77°$ C./5 min.) | 13 | 27.5–44 | 72 | 12 | 73 | | ca. 15 | ca. 15 |
| Wt. loss, percent ($H_2O/100°$ C./50 hrs.) | 44 | 48 | 65 | 45 | | | | |
| After 30 days in water at 37° C. | | | | | | | | |
| Inh. visc. (drawn fil.) | | 0.54 | | 0.58 | | | 0.81 | 0.72 |
| Ten. strength (p.s.i.) | | 23,800 | | 26,000 | | | | |
| Wt. loss (percent) | | 3.5 | | 7.4 | | | 5.6 | 0.3 |
| After 90 days in water at 37° C. | | | | | | | | |
| Inh. visc. (drawn fil.) | | | | 0.34 | | | 0.58 | 0.35 |
| Ten. strength (p.s.i.) | | | | 12,000 | | | | |
| Wt. loss (percent) | | | | 12.1 | | | 7.1 | 3.5 |

EXAMPLES XIV - XV

Copolymers of L-lactide with the intermolecular cyclic esters of alpha-hydroxybutyric acid and alpha-hydroxyheptanoic acid were made by essentially the method of Example V.

A mixture of 44.2 parts of L-lactide and 5.8 parts of the cyclic ester of alpha-hydroxybutyric acid was fused under nitrogen, and there was added 0.08 part of 25 percent solution of diethylzinc in heptane. The mixture was heated at 105°–108°C. for 3 hours at atmospheric pressure in an atmosphere of nitrogen. The resulting copolymer of L-lactide and the intermolecular cyclic ester of alpha-hydroxybutyric acid (88.4/11.6) had an inherent viscosity of 2.15 (0.1 percent solution in benzene).

TABLE V

| Example % Comonomer (by weight) | XIV 11.6% Intermolecular cyclic ester of alpha-hydroxybutyric acid | XV 10% Intermolecular cyclic ester of alpha-hydroxyheptanoic acid |
|---|---|---|
| Inh. viscosity (bulk) | 2.15 | 2.28 |
| Spinning temperature | 185°C. | 190°C. |
| Draw ratio | 10* | 8 |
| Drawing temperature | 94°C., 122°C.* | 98°C. |
| Inherent viscosity | 1.42** | 1.63** |
| Tensile strength (psi) | 66,300 | 59,100 |
| Elongation at break | 22.3% | 18.3% |
| Modulus (psi) | $1.04 \times 10^6$ | $0.95 \times 10^6$ |
| Shrinkage ($H_2O/77°C./5$ min.) | 20.6% | 55.0% |
| Weight loss ($H_2O/100°C./48$ hr.) | 60.5% | 63.6% |

*This filament was drawn in two stages. In the first stage, it was drawn 7× (draw ratio of 7) at 94°C.; in the second, it was drawn at 122°C. to an extent sufficient to give an overall draw ratio of 10.
**Measured on undrawn filament. The inherent viscosities of the filaments of Examples V-XIII were measured on drawn filaments.

EXAMPLE XVI

A mixture of 206 g. of powdered L-lactide/DL-lactide (90/10) copolymer and 0.6182 g. of the monosodium salt of 4-[4-(N-ethyl-p-sulfobenzylamino)diphenylmethylene]-[1-(N-ethyl-N-p-sulfoniumbenzyl)-$\Delta^{2,5}$-cyclohexadienimine][F D & C (Food, Drug, and Cosmetic) Green No. 1] was rotated in a Fisher-Kendall mixer for 48 hours at room temperature. The resulting homogeneous mixture was pressed to a plug and spun into green monofilaments by essentially the method of Example V.

EXAMPLE XVII

The weighed amounts of L(−) lactide melting at 98°–99°C. and having a specific rotation (sodium D-line,) 25°C.) of −295 to −300, and glycolide (m.p. 82.8°–84.5°C.) are mixed in the quantities indicated below and added to a cylindrical tube containing stannous octoate catalyst and a magnetic stir bar. After sealing under 110 mm. of mercury pressure, the vessel is heated at 105°C. for 96 hours with magnetic stirring to yield a cylinder of solid copolymer. In each case, 0.0039 mol. (0.1580 g.) of stannous octoate is used as the catalyst. The monomer initiator ratio (A/I) is 1,500.

The reacting quantities and mol. percent of the comonomers investigated in this example are summarized in the following table:

TABLE VI

| GLYCOLIDE | | | LACTIDE | | |
|---|---|---|---|---|---|
| Mole % | Grams | Moles | Mole % | Grams | Moles |
| 20 | 13.3 | 0.116 | 80 | 66.6 | 0.46 |
| 25* | 19.1 | 0.163 | 75 | 71.4 | 0.49 |
| 30 | 20.2 | 0.17 | 70 | 58.4 | 0.41 |
| 35 | 23.6 | 0.20 | 65 | 54.7 | 0.38 |
| 40 | 26.7 | 0.23 | 60 | 50.4 | 0.35 |
| 45 | 30.2 | 0.26 | 55 | 46.1 | 0.32 |
| 50 | 33.6 | 0.29 | 50 | 41.8 | 0.29 |
| 54 | 39.2 | 0.34 | 46 | 40.1 | 0.28 |
| 70 | 47.1 | 0.41 | 30 | 25.1 | 0.17 |

*Used 0.1780 g. of catalyst

A similar series is run using tetraphenyl tin as a catalyst at an A/I of 2,000 with similar results.

Each copolymer (from 20 mole percent glycolide to 70 mole percent glycolide) is extruded under pressure at a temperature of 10°–220°C. through a 35-mil orifice. The extruded fiber has a diameter of 33–36 mils and is drawn to 5 times its original length. The extruded fibers are heated to 70°–85°C. during this drawing step.

Strong resilient fibers having excellent tensile and dry knot strength are thus obtained, the physical characteristics of these fibers being summarized in the following table:

TABLE VII

| Mole percent glycolide | Diameter, mils | Straight, lbs. | Diameter, mils | Dry knot, lbs. | Initiator | K/S |
|---|---|---|---|---|---|---|
| 20 | 15.9 | 9.57 | 15.4 | 5.96 | Ph | 0.62 |
| 20 | 12.4 | 6.60 | 13.1 | 4.52 | O | 0.68 |
| 25 | 14.7 | 9.14 | 15.2 | 6.61 | O | 0.73 |
| 30 | 14.5 | 8.68 | 15.2 | 4.17 | Ph | 0.48 |
| 30 | 15.1 | 9.28 | 15.1 | 5.50 | O | 0.60 |
| 35 | 14.6 | 10.2 | 14.5 | 5.77 | O | 0.56 |
| 40 | 14.3 | 8.38 | 14.2 | 6.34 | Ph | 0.75 |
| 40 | 14.2 | 10.2 | 14.3 | 5.53 | O | 0.54 |
| 45 | 14.1 | 11.4 | 14.1 | 5.7 | O | 0.50 |
| 50 | 14.8 | 10.0 | 14.7 | 7.17 | Ph | 0.72 |
| 50 | 14.1 | 11.2 | 13.8 | 6.08 | O | 0.54 |
| 60 | 14.2 | 5.26 | 14.0 | 4.98 | Ph | 0.94 |

Ph=tetraphenyl tin, monomer/initiator ratio=2,000.
O=stannous octoate, monomer/initiator ratio=1,500.
K/S=dry knot/straight pull ratio.

The biological behavior of the L(−)-lactide glycolide copolymers prepared in accordance with the present example is summarized in Table VIII. Sections of suture material are implanted subcutaneously in rats and removed at various intervals to determine changes in tensile strength and diameter. A large increase in the diameter of a suture following implantation is an indication of shrinkage (dimensional instability).

TABLE VIII

| Glycolide | Days Post Implantation | | | | |
|---|---|---|---|---|---|
| Mole percent | 0 | 1 | 5 | 10 | 15 |
| 20 tensile strength (lb.) | 10.1 | 8.8 | 5.7 | 4.3 | 4.0 |
| 20 diameter (mils) | 14.8 | 15.4 | 15.6 | 16.4 | 14.4 |
| 25 tensile strength (lb.) | 10.1 | 8.8 | 4.0 | 3.3 | 2.0 |
| 25 diameter (mils) | 15.0 | 15.7 | 15.4 | 15.6 | 14.9 |
| 30 tensile strength (lb.) | 10.3 | 9.3 | 4.4 | 3.0 | 1.8 |
| 30 diameter (mils) | 15.1 | 18.4 | 22.7 | 23.5 | 24.2 |
| 35 tensile strength (lb.) | 10.1 | 6.0 | 1.6 | — | — |
| 35 diameter (mils) | 12.4 | 26.0 | 34.9 | — | — |
| 40 tensile strength (lb.) | 9.6 | 3.4 | 3.2 | 0.0 | — |
| 40 diameter (mils) | 14.0 | 33.8 | 37.4 | 38.1 | — |
| 50 tensile strength (lb.) | 9.9 | 3.3 | 1.4 | 0.0 | — |
| 50 diameter (mils) | 15.0 | 35.6 | 39.4 | 41.6 | — |
| 60 tensile strength (lb.) | 5.6 | 2.8 | 0.2 | — | — |
| 60 diameter (mils) | 14.1 | 30.2 | 36.4 | — | — |

EXAMPLE XVIII

Fifty-four and seven-tenths parts by weight of L(−) lactide (0.38 mols) melting at 98°–99°C. and having a specific rotation (sodium D-line, 25°C.) of −295 to −300 is mixed with 23.6 parts by weight(0.20 mols.)of glycolide (m.p. 82.8°–84.5°C.) and 0.0039 mol. (0.158 parts by weight) of stannous octoate in a dry PYREX glass flask containing a stir bar under dry nitrogen. The monomer initiator ratio (A/I) is 1,500. The glass flask is sealed under 110 mm. of mercury pressure and the vessel is heated at 105°C. for 96 hours with magnetic stirring to yield a solid copolymer.

The 35 mole percent glycolide-lactide copolymer so obtained is extruded under pressure at an elevated temperature through a 35 mil. orifice and drawn to 5 times the original length. The extruded fiber is heated to 70°–85°C. during this drawing step. The biological behavior of this 35 mole percent copolymer in rats is summarized in Table IX.

TABLE IX

Days Post Implantation

|  | 0 | 1 | 5 | 10 | 15 |
|---|---|---|---|---|---|
| Tensile Strength Pounds | 10.0 | 8.9 | 4.2 | 3.1 | 0.4 |
| Tensile Strength p.s.i. × $10^3$ | 60.0 | 53.3 | 25.2 | 18.6 | 2.4 |

A 35 mole percent copolymer, prepared as described above may be extruded to form a rod that can be oriented by drawing 3× at an elevated temperature. The rod so formed will have a tensile strength greater than 25,000 p.s.i.

Although this invention has been specifically illustrated with monofilaments, the products of the present invention may also be manufactured in the form of multifilaments, that may be braided to form sutures. Filaments suitable for braiding having a diameter in the range of 0.00025–0.003 inches may be conveniently obtained by dry spinning a L(−) lactide polymer dissolved in a suitable solvent. The manufacture of a braided Size 2/0 suture from multifilament obtained by dry spinning a L(−) lactide copolymer is illustrated in the following example.

EXAMPLE XIX

A round-bottomed PYREX flask having a long neck is carefully cleaned, flame dried, evacuated and purged 2 times with dry nitrogen. To the flask is added under a dry nitrogen atmosphere:

231.42 parts glycolide(m.p. 82.8°–84.5°C.)—30.19 wt. %
533.52 parts L(−) lactide(m.p. 98°–99°C. )—69.61 wt. %
1.5558 parts stannous octoate—0.20 wt. %.

The flask is evacuated to 125 mm. pressure and heated at 105°C. for 66 hours. The polymer so obtained (inherent viscosity in 0.1 percent chloroform solution = 3.2–3.4) is dissolved in dry 1, 1,2-trichloroethane (distilled from phosphorous pentoxide) to give a clear 8 percent (W/W) solution (bulk viscosity 1,600 poise).

The spin dope (8 percent solution) is heated to 90°C. and extruded through a 10-hole 0.005 inch spinneret (capillary land/diameter = 2.4) at a rate of 3 milliliters per minute into a heated column 15 feet long and 6 inches in diameter. The temperature within the heated column varied from 128°C. at the bottom to 142°C. at the top and the column is swept with hot nitrogen (131–134°C.) at a rate of 5 cubic feet per minute. The extruded filaments are taken up on a reel at a linear speed of 150 feet per minute. The inherent viscosity of the filamentary material is 3.4 indicating no degradation during the spinning process. The copolymer filament is lustrous in appearance and has the following physical characteristics:

Tensile Strength — 1.0 grams/denier
Elongation — 530 percent
Young's Modulus — 24 grams/denier.

The filament contains about 1.5 percent residual solvent.

The yarn from the take-up spool is 6-plied to 60 filaments and drawn 4.5 times at 75°C. and 25 feet per minute input speed through a tubular furnace swept with nitrogen. The drawn yarns prepared as described above have the following physical characteristics:

Tensile Strength — 2.8–3.3 grams/denier
Elongation — 26 percent
Young's Modulus — 50 grams/denier.

The individual filaments have a tensile strength of about 4.8–5.0 grams/denier; an elongation of about 38 percent and a Young's Modulus of about 45 grams per denier. The yarn is braided to form a Size 2/0 braided suture, packaged in a dry atmosphere in a hermetically-sealed container and sterilized by Cobalt 60 gamma irradiation. The in vivo absorption characteristics of this braided suture material in rats are indicated in Table X.

TABLE X

Tensile Strength (×$10^3$ p.s.i.) After Days Post Implantation

| 0 | 1 | 5 | 10 | 15 |
|---|---|---|---|---|
| 36 | 47 | 37 | 32 | 30 |

It will be noted from a comparison of Table IX and Table X that the braided structure obtained from yarn that has been dry spun from a suitable solvent (Example XIX) retained in vivo tensile strength for a longer period of time than a melt extruded monofilament of similar composition (Example XVIII). The improvement in in vivo tensile strength exhibited by the dry spun braided suture is such that the amount of glycolide in the lactide copolymer composition may be increased to 40 mole per cent (34.8 weight percent glycolide; 65.2 weight percent L-lactide). A copolymer suture of this composition (40 mole per cent glycolide 60 mole percent L-lactide) has tensile strength and absorption characteristics similar to catgut.

Figure 4:
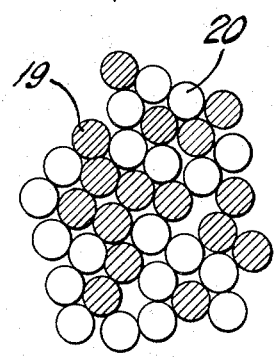
FIG. 4 is a cross-sectional view of a composite yarn containing filaments of different composition.

Multifilament yarns that contain polylactide filaments together with nonabsorbable filaments of DACRON, TEFLON, nylon, etc. are useful in the manufacture of vascular grafts. Such a multifilament yarn is illustrated in FIG. 4 wherein the nonabsorbable fiber is represented by the hatched fiber cross-section 19. In FIG. 4, the fibers 20 are extruded from lactide polymer and copolymer compositions as described above. The relative proportions of absorbable filaments 20 and nonabsorbable filaments 19 may be varied to obtain the absorption characteristic desired in the woven fabric or tubular implants. Methods of weaving and crimping vascular prostheses are described in U.S. Pat. No. 3,096,560.

Figure 5:
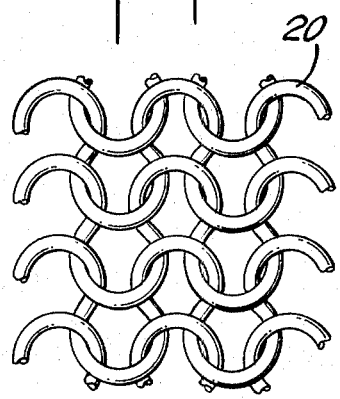
FIG. 5 is a plan view of a knitted fabric.

Composite fabrics of absorbable and nonabsorbable materials fashioned by textile processes including weaving, knitting, and fabricating by the nonwoven felting of fibers are described in U.S. Pat. No. 3,108,357 and U.S. Patent No. 3,463,158. Similar techniques may be used in the manufacture of surgical aids wherein nonabsorbable fibers are combined with absorbable fibers composed of lactide polymers and copolymers. The surgical utility of "bicomponent filaments" containing absorbable and nonabsorbable components is described in U.S. Pat. No. 3,463,158, the teaching of which is incorporated herein by reference. Monofilaments of lactide polymers and copolymers may be woven or knitted to form an absorbable fabric having the structure illustrated in FIG. 5, useful surgically in hernia repair and in supporting damaged liver, kidney, and other internal organs.

The products of the invention are useful in surgical applications where an absorbable aid or support is required, for example, in the formation of surgical mesh, absorbable staple, artificial tendons, or cartilage material, and in other uses where a temporary aid during healing is needed. They may also be used to advantage in repairing hernias and in anchoring organs which have become loose.

As many apparently widely different embodiments of this invention may be made without departing from the spirit and scope thereof, it is to be understood that this invention is not limited to the specific embodiments thereof except as defined in the appended claims.

I claim:

1. A sterile vascular graft manufactured from a multifilament yarn containing non-absorbable filaments selected from the group consisting of polyester filaments, polytetrafluoroethylene, and nylon filaments; said sterile multifilament yarn also containing filaments absorbable without causing unfavorable tissue reaction and essentially dimensionally stable within the body, said absorbable filaments comprising an oriented synthetic polylactide polymer containing more than about 85 percent by weight of repeating units of one antipodal species of $\alpha$-hydroxypropionic acid and no more than about 15 percent by weight of repeating units of the formula

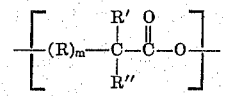

where R is lower alkylene, $m$ is an integer of zero to 1, R' is selected from the class consisting of hydrogen and lower alkyl, and R", which can be the same or different than R', is selected from the class consisting of hydrogen and alkyl of up to 22 carbons when m is zero and, when $m$ is 1, R" is selected from the class consisting of hydrogen and lower alkyl, said polylactide before being oriented being characterized by having an inherent viscosity of at least 1.2 at 0.1 percent concentration in benzene at 25°C. and by losing at least about 20 percent of its weight on treatment with boiling water for a period of 100 hours, and being further characterized by exhibiting a tensile strength of from 40,000 to about 100,000 p.s.i. and by having a diameter of 0.0005–0.045 inches; said sterile vascular graft being packaged in a dry atmosphere within a hermetically-sealed container.

2. The vascular graft of claim 1, packaged within an evacuated, hermetically-sealed container.

3. A sterile vascular graft manufactured from a multifilament yarn containing non-absorbable filaments selected from the group consisting of polyester filaments, polytetrafluoroethylene filaments, and nylon filaments; said sterile multifilament yarn also containing filaments absorbable without causing unfavorable tissue reaction and essentially dimensionally stable within the body, said absorbable filaments comprising an oriented synthetic polylactide copolymer containing at least about 65 mol per cent of repeating units derived from one antipodal species of $\alpha$-hydroxypropionic acid and not more than about 35 mol percent of repeating units derived from $\alpha$-hydroxyacetic acid, said polylactide being characterized by having an inherent viscosity of at least 1.2 at 0.1 percent concentration in a suitable solvent at 25°C. and by losing at least about 20 percent of its weight on treatment with boiling water for a period of 100 hours, and being further characterized by exhibiting a tensile strength of from 40,000 p.s.i. to about 100,000 p.s.i. and by having a diameter of 0.0005–0.045 inches; said sterile vascular graft being packaged in a dry atmosphere within a hermetically-sealed container.

4. The vascular graft of claim 3, packaged within an evacuated, hermetically-sealed container.

5. A sterile absorbable fabric, useful surgically in hernia repair and in supporting damaged liver, kidney, and other organs, said fabric being woven or knitted of filaments that are absorbable without causing unfavorable tissue reaction, and essentially dimensionally stable within the body said filaments comprising an oriented synthetic polylactide polymer containing more than about 85 percent by weight of repeating units of one antipodal species of $\alpha$-hydroxypropionic acid and no more than about 15 percent by weight of repeating units of the formula

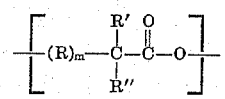

where R is lower alkylene, m is an integer of zero to 1, R' is selected from the class consisting of hydrogen and lower alkyl, and R", which can be the same or different than R', is selected from the class consisting of hydrogen and alkyl of up to 22 carbons when $m$ is zero and, when $m$ is 1, R" is selected from the class consisting of hydrogen and lower alkyl, said polylactide before being oriented being characterized by having an inherent viscosity of at least 1.2 at 0.1 percent concentration in benzene at 25°C. and by losing at least about 20 percent of its weight on treatment with boiling water for a period of 100 hours, and being further characterized by exhibiting a tensile strength of from 40,000 to about 100,000 p.s.i. and by having a diameter of 0.0005–0.045 inches.

6. A sterile absorbable fabric, useful surgically in hernia repair and in supporting damaged liver, kidney and other organs, said fabric being woven or knitted of filaments that are absorbable without causing unfavorable tissue reaction, and essentially dimensionally stable within the body said filaments comprising an oriented synthetic polylactide copolymer containing at least about 65 mol percent of repeating units derived from one antipodal species of $\alpha$-hydroxypropionic acid and not more than about 35 mol percent of repeating units derived from $\alpha$-hydroxyacetic acid, said polylactide being characterized by having an inherent viscosity of at least 1.2 at 0.1 percent concentration in a suitable solvent at 25°C. and by losing at least about 20 percent of its weight on treatment with boiling water for a period of 100 hours, and being further characterized by exhibiting a tensile strength of from 40,000 p.s.i. to about 100,000 p.s.i. and by having a diameter of 0.0005–0.045 inches.

* * * * *

UNITED STATES PATENT OFFICE
CERTIFICATE OF CORRECTION

Patent No. 3,797,499    Dated March 19, 1974

Inventor(s) Allan K. Schneider

It is certified that error appears in the above-identified patent and that said Letters Patent are hereby corrected as shown below:

In the Title, "Graphs" should read --- Grafts ---.

In Column 2, lines 6 and 7, "repating" should read --- repeating ---.

In Column 6, line 12, "zonc" should read --- zinc ---.

In Table IV, Column VI heading should read --- 7.5% DL-lactide ---.

In Table IV, Example XIII, "2.63" should read --- 2.68 ---.

In Table IV, Example VII, "$1.1=10_6$" should read --- $1.1 \times 10^6$ ---.

Signed and sealed this 30th day of July 1974.

(SEAL)
Attest:

McCOY M. GIBSON, JR.　　　C. MARSHALL DANN
Attesting Officer　　　　　Commissioner of Patents